(12) United States Patent
Jha et al.

(10) Patent No.: US 10,425,465 B1
(45) Date of Patent: Sep. 24, 2019

(54) HYBRID CLOUD API MANAGEMENT

(71) Applicant: Google LLC, Mountain View, CA (US)

(72) Inventors: Prabhat Jha, San Jose, CA (US);
Akhil Arora, San Jose, CA (US);
Gregory Brail, Palo Alto, CA (US);
Martin Nally, San Jose, CA (US);
Peter Johnson, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/224,294

(22) Filed: Jul. 29, 2016

(51) Int. Cl.
*H04L 29/08* (2006.01)
*H04L 29/06* (2006.01)

(52) U.S. Cl.
CPC .............. *H04L 67/02* (2013.01); *H04L 67/10* (2013.01); *H04L 67/20* (2013.01); *H04L 67/42* (2013.01)

(58) Field of Classification Search
CPC .... G06Q 10/0631; G06Q 10/06; G06Q 10/10; H04L 9/3263; H04L 63/0823; H04L 9/3247; H04L 9/3268; H04L 63/107; H04L 63/20; H04L 9/0643; H04L 9/0844; H04L 9/30; H04L 2209/76; H04L 2463/062; H04L 63/0884; H04L 65/602; H04L 9/3213; H04L 63/0442; H04L 63/08; H04L 2209/56; H04L 63/045; H04L 63/062; H04L 67/28; H04L 63/029; H04L 9/14; H04L 9/3236; H04L 9/0816; H04L 9/0825; H04L 9/0841; H04L 9/085; H04L 12/2834; H04L 63/0272; H04L 41/22; H04L 12/6418; H04L 41/28; H04L 63/10; H04L 67/02; G06F 21/602; G06F 21/31; G06F 16/95

See application file for complete search history.

(56) References Cited

U.S. PATENT DOCUMENTS

| | | | | |
|---|---|---|---|---|
| 10,148,493 | B1* | 12/2018 | Ennis, Jr. | H04L 67/34 |
| 2003/0145205 | A1* | 7/2003 | Sarcanin | G06Q 20/02 |
| | | | | 713/172 |
| 2006/0173974 | A1* | 8/2006 | Tang | H04L 63/029 |
| | | | | 709/217 |
| 2006/0282386 | A1* | 12/2006 | Szeto | H04L 51/04 |
| | | | | 705/50 |
| 2012/0072597 | A1* | 3/2012 | Teather | G06F 9/5072 |
| | | | | 709/226 |
| 2012/0110055 | A1* | 5/2012 | Van Biljon | G06Q 30/04 |
| | | | | 709/201 |
| 2012/0124211 | A1* | 5/2012 | Kampas | G06F 9/50 |
| | | | | 709/226 |
| 2013/0080509 | A1* | 3/2013 | Wang | H04L 12/66 |
| | | | | 709/203 |
| 2013/0132584 | A1* | 5/2013 | Palladino | H04L 65/40 |
| | | | | 709/226 |
| 2013/0191509 | A1* | 7/2013 | Loughry | G06F 9/541 |
| | | | | 709/219 |

(Continued)

*Primary Examiner* — Sargon N Nano
(74) *Attorney, Agent, or Firm* — Fish & Richardson P.C.

(57) ABSTRACT

A method of serving an API request includes receiving the API request at a local API proxy deployed at a local deployment environment. The method includes utilizing the local API proxy to service the API request at the local deployment environment, establishing a connection with a remote API management server, and providing to the remote API management server, via the connection, at least metadata about the API request.

18 Claims, 11 Drawing Sheets

(56) References Cited

U.S. PATENT DOCUMENTS

| | | | |
|---|---|---|---|
| 2014/0059226 A1* | 2/2014 | Messerli | G06F 9/5072 709/226 |
| 2015/0074278 A1* | 3/2015 | Maes | H04L 47/70 709/226 |
| 2015/0180949 A1* | 6/2015 | Maes | H04L 43/10 709/201 |
| 2017/0019313 A1* | 1/2017 | Doshi | G06N 3/12 |
| 2017/0141926 A1* | 5/2017 | Xu | H04L 9/3247 |

* cited by examiner

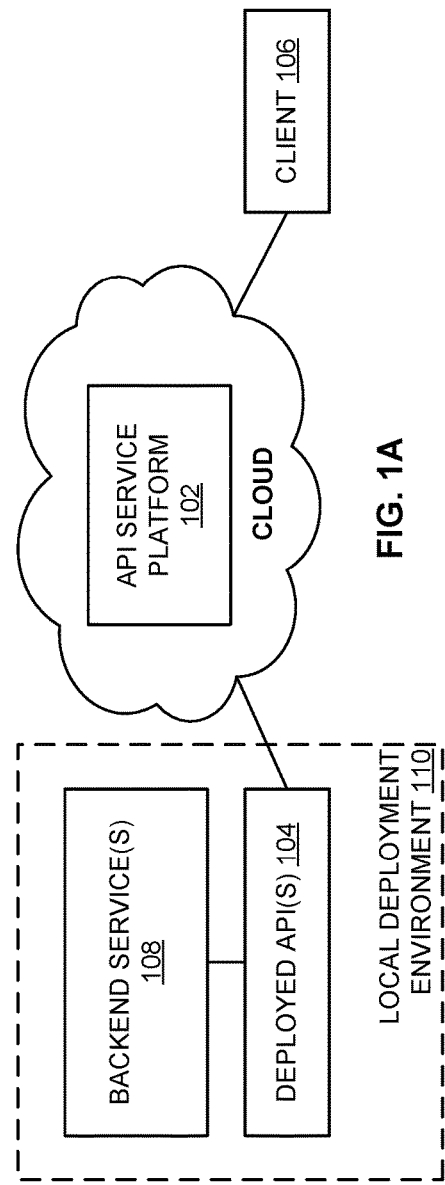
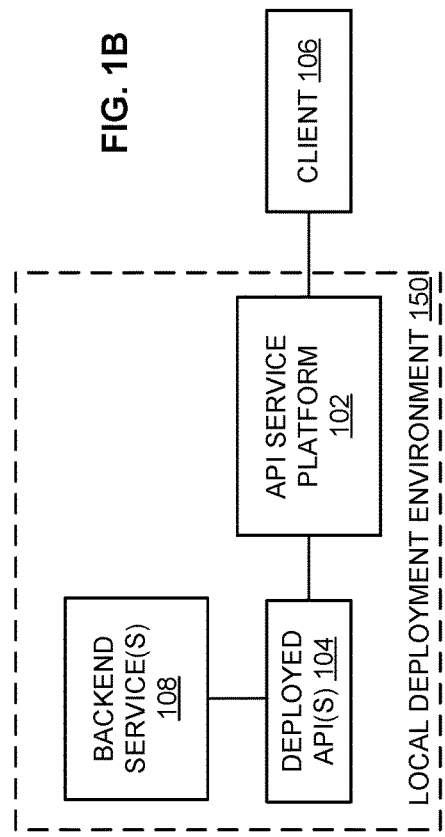

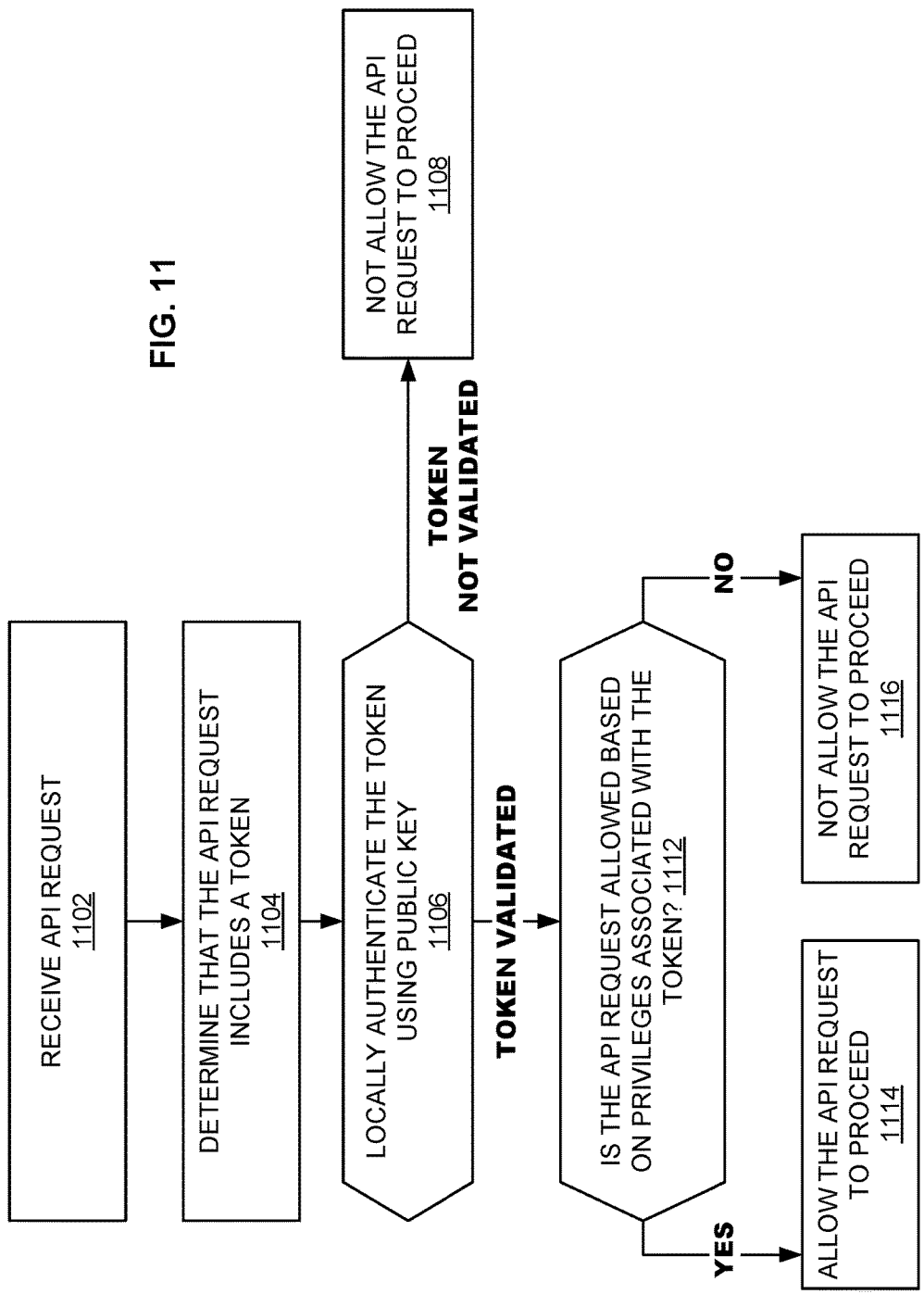

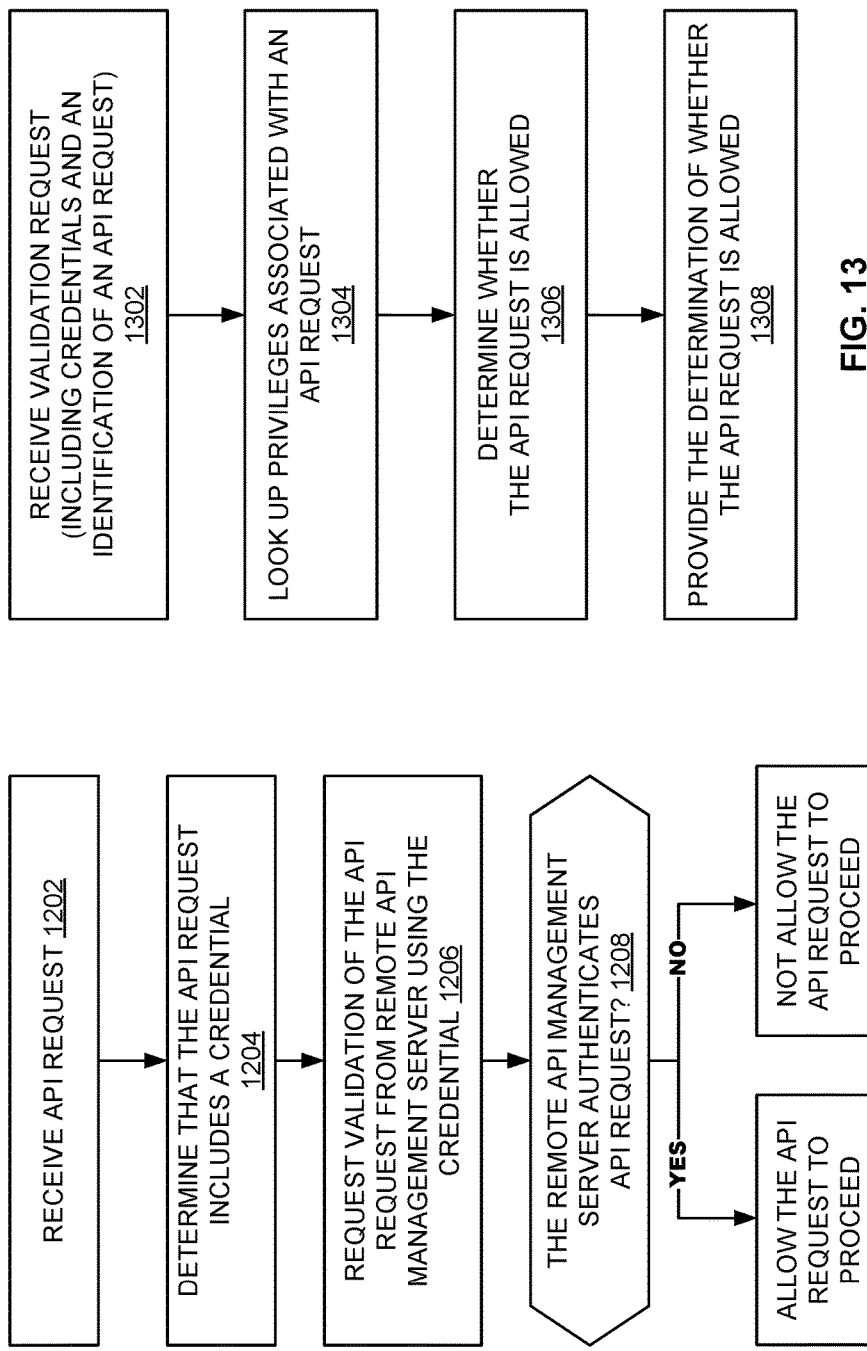

HYBRID CLOUD API MANAGEMENT

BACKGROUND OF THE INVENTION

An application programming interface (API) operates by exposing entry points to logic, services, and data. API management services can track APIs that utilize backend data/services, and provide fine control of the usage of the backend data/services (e.g., by handling each API call). Implementing an API management service locally is often resource intensive. An alternative approach is contracting with a third party (e.g., a party other than a service provider or client application) to provide API management services. However, in some instances, a third party is not permitted to handle API calls and/or transmit data/services due to security and or compliance regulations (e.g., HIPAA, Gramm-Leach-Bliley Act, Homeland Security Act, etc.). Thus, there is a need for an API management system that secures data transmissions, accommodates security and compliance regulations, and provides robust API management features in a manner that reduces the need for local computing resources.

BRIEF DESCRIPTION OF THE DRAWINGS

Various embodiments of the disclosure are disclosed in the following detailed description and the accompanying drawings.

FIG. 1A is a block diagram illustrating a system for API management having an API service platform deployed in a network cloud.

FIG. 1B is a block diagram illustrating a system for API management having a locally-deployed API service platform.

FIG. 11 is a flowchart illustrating an embodiment of a process for handling an API request including a token for authentication.

FIG. 12 is a flowchart illustrating an embodiment of a process for handling an API request including a credential for authentication.

FIG. 13 is a flowchart illustrating an embodiment of a process for handling an API request including a credential for authentication.

DETAILED DESCRIPTION

Figure 2:
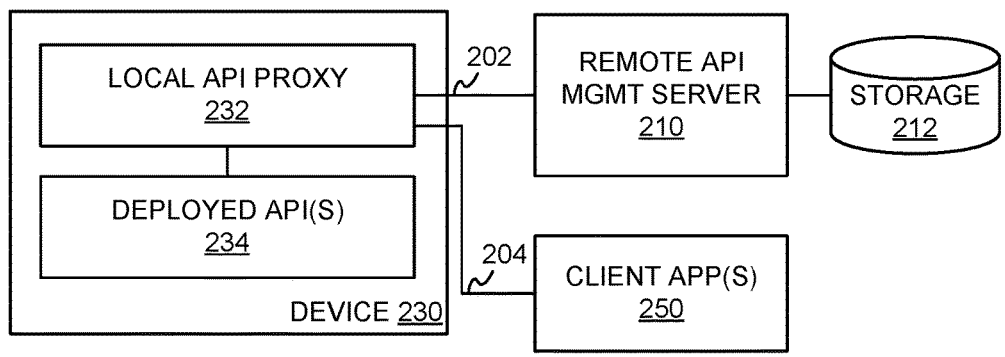
FIG. 2 is a block diagram illustrating an embodiment of a system for hybrid cloud API management including a local API proxy deployed on a device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques of the present disclosure provide hybrid cloud API management in which API management functionalities are distributed between a remote API management server in a network cloud environment (e.g., managed by a third-party) and a local API proxy (e.g., local to an end server/data provider). In some embodiments, the local API proxy is a gateway/interface/application deployed in a service provider's environment that forwards API requests made by a client application ("client app") to a deployed API. The deployed API exposes backend data/services to the client app. The local API proxy tracks and provides API metadata regarding client application access of backend data/services to the remote API management server. In some embodiments, the local API proxy is implemented on a local device (e.g., in a local data center of a service provider) and cooperates with the remote API management server to manage one or more APIs. For example, traffic control rules and constraints are defined via the remote API management server and at least in part enforced by the local API proxy. In some embodiments, the physical proximity of the local API proxy to backend data/services reduces network latency compared with conventional API management systems. By using a lightweight local API proxy that communicates with a remote API management server, relatively little local infrastructure is used while providing full-featured API management including analytics, security, and other functions.

FIG. 1A is a block diagram illustrating a system for API management having an API service platform deployed in a network cloud. The system shown in FIG. 1A includes an API service platform 102 ("platform"), one or more deployed APIs 104, one or more client apps ("client") 106, and one or more backend data/services 108.

Backend data/services 108 includes a content repository of a service provider. Service providers offer backend data/services online for consumption by applications running on mobile devices and desktops. In some embodiments, platform 102 provides proxying and management functions for content and/or a service provided by backend data/service 108.

Client 106 accesses backend data/service 108 using an API 104. A client may develop applications that make API requests to access backend data/service 108. For example, a mobile application implemented by client 106 accesses backend data/service 108 via deployed API 104. The mobile application may make API requests that are serviced by deployed API 104.

Deployed API 104 hosts/processes API implementation code of one or more APIs that expose backend data/services 108. When an API call is received at deployed API 104, deployed API 104 processes and provides a response in response to the API request. Using APIs hosted by deployed API 104, service providers can make backend data/services 108 available online for consumption by client apps running on mobile devices and desktops. The deployed API 104 may be stored by platform 102.

Platform 102 is deployed in a network cloud (SaaS). Platform 102 is deployed outside a local deployment environment 110 of a service provider. In some embodiments, the platform is controlled by a third party (a party other than a party that controls deployed APIs 104 and a party that controls backend data/service 108) to provide services without needing to modify deployed API 104. In some embodiments, platform 102 enables secure access to backend data/service 108 via an API 104. For example, rather than having a client application (e.g., application of client 106) access backend data/service 108 directly, the client application accesses platform 102 that functions to map a publicly available web endpoint via an API to backend data/service 108 by proxying an API request from client app 106 to deployed API 104.

By acting as an intermediary between client app 106 and deployed API 104, platform 102 is able to provide API management services including proxying and analytics. Platform 102 includes one or more proxies to forward API requests to deployed API 104. Platform 102 accommodates mechanisms for consuming services, analyzes API usage, implements security measures, and maintains these services such that they continue to function over time as services are added, modified, or deleted. For example, instead of accessing backend data/service 108 directly, client 106 makes an API request to platform 102, and the platform proxies the request to deployed API 104, which may access backend data/service 108 to respond to the API request. An API service platform deployed in a network cloud as shown in FIG. 1A is vulnerable to attacks that might occur in a transmission link between the network cloud and the service provider data center (e.g., deployed API 104 and/or backend data/service 108). Also, some service providers are not permitted to send data outside their data center or have third parties receive API requests due to security and/or compliance.

In operation, client 106 makes an API request. Platform 102 receives the API request and proxies the request to deployed API 104. By contrast, in a conventional system, a client directly makes a request to a deployed API. Deployed API 104 exposes backend data/services 108 to client 106. For example, backend data/services may provide product pricing and availability information, sales and ordering services, order tracking services, and any other services required by client apps by exposing services as a set of Web endpoints. Client app developers may then make Web requests to these endpoints in developed application code. In some embodiments, platform 102 provides analytics and traffic management for the API requests.

FIG. 1B is a block diagram illustrating a system for API management having a locally-deployed API service platform. The system shown in FIG. 1B includes an API service platform 102 ("platform"), one or more deployed APIs 104, one or more client applications 106 ("client app"), and one or more backend data/services 108. Each of these components function like those described with respect to FIG. 1A unless otherwise described herein.

Unlike the platform shown in FIG. 1A, platform 102 is deployed within computing local deployment environment 150 of an API service provider. For example, the local deployment environment 150 of the service provider includes platform 102, deployed API 104, and backend service 108. The service provider installs, manages, and operates the API service platform in its own local deployment environment 150 and retains control of the environment and of the deployment taxonomies. However, installing, managing, and operating a full-featured local API service platform incurs high infrastructure and operational costs.

FIG. 2 is a block diagram illustrating an embodiment of a system for hybrid cloud API management including a local API proxy deployed on a device. The system shown in FIG. 2 includes a remote API management server 210, storage 212, a device 230, and one or more client apps 250.

Device 230 makes its backend data/services (not shown) available online for consumption by client apps 250. In various embodiments, the device is a data center/application environment associated with a service provider. The service provider may manage its backend data/services and product offerings using device 230. For example, a service provider can be an organization, an enterprise, an individual or group of individuals, etc. Device 230 includes local API proxy 232, one or more deployed APIs 234, and one or more backend data/services (not shown).

In contrast to a conventional system, in which a client directly makes a request to a deployed API, local API proxy 232 in device 230 proxies API requests between client app 250 and deployed API 234, and provides API management using remote API management server 210. In some embodiments, remote API management server 210 handles various processing tasks, which minimizes resources needed to operate local API proxy 232, while allowing the device in which the local API proxy is deployed to comply with security regulations to directly receive and handle API calls and/or maintain certain data/records within the service provider's own deployment environment/data center.

Local API proxy 232 receives an API request and proxies the request to deployed API 234. backend data/service. Local API proxy 232 accommodates diverse mechanisms for consuming services, implements security measures, and maintains these services such that they continue to function over time as services are added, modified, or deleted. In some embodiments, local API proxy 232 is a lightweight API runtime infrastructure deployed in device 230. In some embodiments, local API proxy 232 cooperates with remote API management server 210 to administer API management functionalities as further described herein. In some embodiments, local API proxy 232 is a message processor for deployed API 234, for example an HTTP-based message processor. In some embodiments, local API proxy 232 is configured to proxy requests and responses to and from backend data/services. For example, local API proxy 232 receives an API request from client app 250 and proxies the request to deployed API 234. Deployed API 234 fulfills the API request, for example, by performing the processing required to provide backend data/services. Local API proxy 232 forwards the response from backend data/services to client app 250. In some embodiments, local API proxy 232 synchronously or asynchronously pushes information about API requests and responses such as API usage/management statistics/data to remote API management server 210.

In some embodiments, local API proxy 232, in conjunction with remote API management server 210, performs analytics, security, and management functions. In some embodiments, local API proxy 232, in conjunction with remote API management server 210, provides security and/or traffic management such as request spike arrest and quota enforcement, as further described herein In some embodiments, local API proxy 232 secures communications between the remote API management server and itself, for example, when pushing API usage data to the remote API management server. For example, the local API proxy generates a secret, which the secret is to secure subsequent communications between the local API proxy and the remote API management server. In some embodiments, the secret is generated during configuration. An example process of generating the secret and using the secret to secure communications between the local API proxy and the remote API management server is further described herein with respect to FIGS. 7 and 14.

As shown in FIG. 2, local API proxy 232 is deployed in a local deployment environment of a service provider. For example, local API proxy 232 is installed in the same data center (e.g., same device, same machine, same group of devices) as servers hosting backend data/services. Local API proxy 232 may be installed within a trusted network in close proximity to backend data/services. This reduces network latency and provides secure transmittal of backend data/services. Operating the local API proxy 232 does not require heavy infrastructure and resources of its deployment environment because the local API proxy is able to offload storage, processing, and handling of API management to remote API management server, For example, local API proxy 232 merely acts as a proxy while configuration data and heavy processing is remotely performed at remote server 210.

In some embodiments, local API proxy is implemented by a single process server. The single process server facilitates automation and containerization by not requiring two separate processes for launching the local API proxy by an agent.

Servers hosting backend data/services provide processing and a content repository of a service provider. An example of backend data/services is 108 shown in FIG. 1A. In some embodiments, local API proxy 232 acts as an interface for content and/or a service provided by backend data/services. In some embodiments, backend data/service is optional and deployed API 234 provides functionality without accessing backend data/services. In some embodiments, the service provider programs client app 250 to access services of local API proxy 232 and/or remote API management server 210. For example, the service provider develops both client app 250 and deployed API 234, wherein the client app 250 accesses the deployed API 234 via local API proxy 232.

Deployed API 234 hosts/processes API implementation code of one or more APIs that expose backend data/services. An example of deployed API 234 is 104 shown in FIG. 1A. In some embodiments, deployed API 234 is a well-defined API that is consistent across services, regardless of service implementation. In some embodiments, deployed API 234 is stored by remote API management server 210, e.g., in storage 212. In some embodiments, deployed API 234 is stored locally on the device 230.

An example of remote API management server 210 is API service platform 102 shown in FIG. 1A. In contrast to platform 102, remote API management server 210 operates in conjunction with local API proxy 232. For example, local API proxy 232 handles proxying/forwarding API requests and provides information about how the API requests are handled to remote API management server 210. Remote API management server 210 includes analytics processors that consume API data received from the local API proxy. Remote API management server 210 performs API services, analytics services, and the like based on the information about how the API requests are handled.

In some embodiments, API services facilitate development of APIs, for example, tools for adding and configuring API proxies, setting up API products, managing service provider developers and client apps, a flexible data store, etc. Example API services include social graphs, geolocation, user management, push notifications, performance monitoring, etc.

Analytics services provide information about API usage trends. In some embodiments, analytics services provide tools to analyze short- and long-term usage trends of APIs. For example, audiences may be segmented by top developers and apps to understand usage by API methods to know where to invest, and create custom reports on business- or operational-level information and the like. In some embodiments, as API requests pass through local API proxy 232, several types of information are collected including URL, IP, user ID for API call information, latency, error data, etc. Policies may be created to add other information, such as headers, query parameters, and portions of a request or response extracted from XML, or JSON. The collected information is sent to the remote API management server. In some embodiments, the information is collected and/or sent asynchronously from the actual request/response flow and does not slow API performance.

Developer services provide tools to manage the community of app developers using the backend services, for example, tools to onboard developers and create a developer portal. In some embodiments, developer services provide tools to manage a community of app developers using such services. Developer services may offer the flexibility to work with internal and external developers and formalize these relationships with financial models. In some embodiments, developer services are utilized to onboard developers and create a developer portal for publicly available API products. Application developers may connect to the portal to access API documentation, forums, blog entries, etc. In some embodiments, monetization capabilities provide financial infrastructure and relationships for digital assets. Monetization may allow a variety of rate plans that charge for the use of API products or through revenue-sharing. Monetization plans may include pre-paid plans, post-paid plans, fixed-fee plans, variable rate plans, "freemium" plans, etc. In some embodiments, remote API management server 210 provides monetization reporting and billing services.

These services together may provide a comprehensive infrastructure for API creation, security, management, and operations, as well as backend data/services for developing client apps. In some embodiments, these services are provided with the aid of the local API proxy, where the local API proxy provides the remote API management server with API execution data as further described herein.

Remote API management server 210, in conjunction with local API proxy 232, handles security and authorization tasks to protect backend services, as well as to analyze, track, manage, monitor, and monetize the services. In some embodiments, policies on remote API management server 210 are utilized to add functionality to a service without having to make any changes to the backend service. For example, policies may be added to perform data transformations and filtering, add security, execute conditional logic or custom code, and to perform various other actions via local API proxy 232 by sending a command (e.g., 1414 of FIG. 14). In another example, access may be revoked/modified so that a particular client application no longer has full access to the backend services via local API proxy 232. In another example, polices may be implemented to limit, track, and manage access to services.

In some embodiments, remote API management server 210 authorizes client requests to local API proxy 232 by issuing a self-authenticating token. For example, the remote API management server provides client app 250 with the self-authenticating signed token. The token is provided to the local API proxy by the client app when making API requests, and the token issued by the remote API management server is used by the local API proxy to validate the API request. In some embodiments, local API proxy 232 relays communications between the client app and the remote API management server. An example process of requesting a token, generating a token, and making an API call with the token is further described herein, e.g., with respect to FIGS. 7, 9, and 10. As another example, the remote API management server validates the API request based on a credential associated with a client app. An example process of authenticating a client app based on a credential is further described herein, e.g., with respect to FIGS. 12 and 13.

Storage 212 may include one or more hardware and/or software interfaces to store and/or obtain data. In some embodiments, storage 212 stores reporting data provided by local API proxies such as data obtained during the process shown in FIG. 14. Examples of storage 212 include a storage device, a secure storage, a server, a database, a distributed storage, a data structure, and any other type of storage or computing device. In some embodiments, any of the components of remote API management server 210 may be included in the same device. In some embodiments, any of the components of remote API management server 210 may represent a group of devices.

Client app 250 accesses backend service(s) via local API proxy 232 according to the techniques described herein. An example of client 250 is client 106 shown in FIG. 1A. Unlike client 106, client 250 is configured to send API requests to local API proxy 232 instead of to deployed API 234 and/or to remote API management server 210. The client apps that consume these services can be implemented as standalone apps for a mobile device or tablet, as Web apps running in a browser, or as any other type of application that can make a request to a Web endpoint and consume any response data. These applications might be developed and released by the same service provider that exposed the services or by third-party app developers who make use of publicly available services.

In operation, local API proxy 232 is installed on device 230. For example, the installation includes configuration according to the process shown in FIG. 7. After installation, local API proxy 232 handles API requests made by client app 250 as follows. Client app 250 makes an API request. For example, the API request can be an API call. The API request is received by local API proxy 232. Local API proxy 232 forwards the request to deployed API 234 backend data/services. The deployed API 234 services the request, e.g., by accessing backend data/services to fulfill the request. For example, an API request is handled according to the process shown in FIG. 8. In some embodiments, local API proxy 232 provides information (e.g., API execution data) to remote API management server 210. By way of a non-limiting example, API execution data (e.g., metadata) includes what token was used to obtain access, latency, and characteristics of the API call. Remote API management server 210 processes the received information to provide analytics that may be accessible by client app 250 and/or device 230 to evaluate performance. For example, remote API management server 210 handles information received from local API proxy 232 according to the process shown in FIG. 14.

In some embodiments, the API request includes a security feature (e.g., a token, a credential, etc.). The security feature may be used to validate the API request. For example, the API request includes a self-authenticating signed token, where the token is signed and provided by the remote API management server. An example process of requesting a token, generating a token, and making an API call with the token is further described herein, e.g., with respect to FIGS. 7, 9, and 10. As another example, the API request includes a credential, where the credential is used by the remote API management server to validate the API request. The credentials or token may be revoked and/or limited dynamically (e.g., limited in time, limited in count, limited in manner associated with a quota, etc.) as further described herein. At least some of the credentials or token may be obtained at the time of installation as further described herein.

One or more of the components shown in FIG. 2 may be communicatively coupled via a network (not shown). For example, communication link 202 between local API proxy 232 and remote API management server 210 and communication link 204 between local API proxy 232 and client app 250 may each be implemented in one or more networks. In some embodiments, communications between local API proxy 232 and remote API management server 210 via link 202 are secured according to the processes shown in FIGS. 7 and 14. In some embodiments, communications between client app 250 and remote API management server 210 via links 202, 204 are secured according to the processes shown in FIGS. 7-13. Examples of networks include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together.

Any of the components shown in FIG. 2 may represent one or more physical devices. For example, remote API management server 210, device 230, and client app 250 each represent a different computer device. Any of the components shown in FIG. 2 may be integrated together with one or more other components shown in FIG. 2 and/or a component not shown in FIG. 2. Examples of the remote sever 210, device 230, and client app 250 include a server, a personal computer, a desktop computer, an electronic reader, a laptop computer, a storage, a smartphone, a tablet computer, a mobile device, a wearable device, a wearable computer, and any other computer or electronic device.

The components shown in FIG. 2 may be communicatively coupled via a network (not shown). Examples of networks include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together.

In various embodiments, the components shown in FIG. 2 may exist in various combinations of hardware machines. Other communication paths may exist and the example of FIG. 2 has been simplified to illustrate the example clearly. Although single instances of components have been shown to simplify the diagram, additional instances of any of the components shown in FIG. 2 may exist. Components not shown in FIG. 2 may also exist to perform and provide functions and services described herein.

Figure 3:
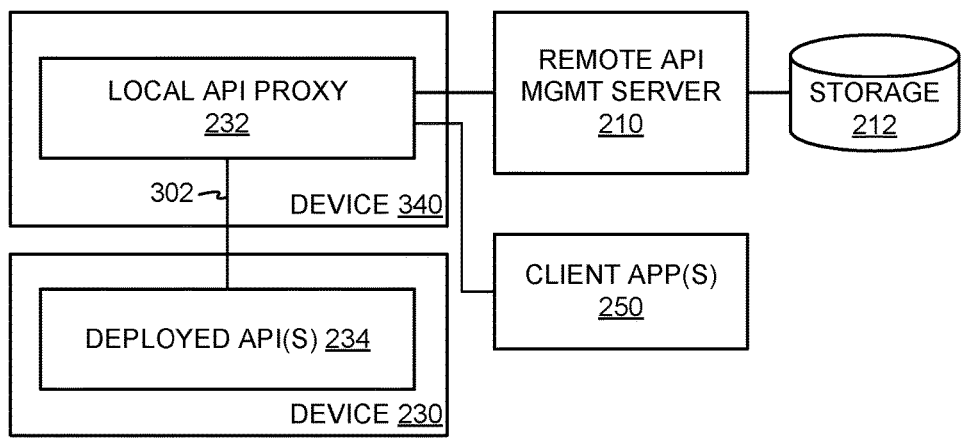
FIG. 3 is a block diagram illustrating an embodiment of a system for hybrid cloud API management including a local API proxy that is installed on a device different from the device on which one or more API implementations are installed.

FIG. 3 is a block diagram illustrating an embodiment of a system for hybrid cloud API management including a local API proxy that is installed on a device different from the device on which one or more API implementations are installed. The system shown in FIG. 3 includes a remote API management server 210, storage 212, a first device 230, a second device 340, and one or more client apps 250. Each of these components function like those described with respect to FIG. 2 unless otherwise described herein.

In the example shown in FIG. 3, local API proxy 232 is deployed on device 340 and API 234 and backend data/service are deployed on device 230. As shown in FIG. 3, local API proxy 232 is implemented on a device separate from device 230 that hosts deployed API(s) 234. Device 340 makes backend data/services (which may be deployed in device 340 or an external device such as device 230) available online for consumption by client apps 250 via local API proxy 232 according to the techniques described herein. Devices 230 and 340 may be connected via a network connection. For example, local API proxy 232 exposes backend data/service to client app(s) 250 via API 234. Local API proxy 232 is communicatively coupled to API 234 and/or backend data/service via communication link 302.

In operation, local API proxy 232 is installed on device 340. In some embodiments, local API proxy 232 is installed within a local deployment environment of a service provider, e.g., the local deployment environment including devices 340 and 230. For example, the installation includes configuration according to the process shown in FIG. 7. After installation, local API proxy 232 handles API requests made by client app 250 as follows. Client app 250 makes an API request. For example, the API request can be an API call. The API request is received by local API proxy 232. Local API proxy 232 forwards the request to deployed API 234. For example, an API request is handled according to the process shown in FIG. 8. In some embodiments, local API proxy 232 provides information (e.g., API execution data) to remote API management server 210. By way of a non-limiting example, API execution data (e.g., metadata) includes what token was used to obtain access, latency, and characteristics of the API call. Remote API management server 210 processes the received information to provide analytics that may be accessible by client app 250 and/or device 230 to evaluate performance. For example, remote API management server 210 handles information received from local API proxy 232 according to the process shown in FIG. 14. In some embodiments, the API request includes a security feature (e.g., a token, a credential, etc.). An example of handling an API request including the security feature is provided with respect to FIG. 2.

Like the other components shown in FIG. 3, device 340 may represent one or more physical devices. For example, remote API management server 210, device 340, device 230, and client app 250 each represent a different computer device. Any of the components shown in FIG. 3 may be integrated together with one or more other components shown in FIG. 3 and/or a component not shown in FIG. 3. Examples of device 340 include a server, a personal computer, a desktop computer, an electronic reader, a laptop computer, a storage, a smartphone, a tablet computer, a mobile device, a wearable device, a wearable computer, and any other computer or electronic device.

The components shown in FIG. 3 may be communicatively coupled via a network (not shown). Examples of networks include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together.

In various embodiments, the components shown in FIG. 3 may exist in various combinations of hardware machines. Other communication paths may exist and the example of FIG. 3 has been simplified to illustrate the example clearly. Although single instances of components have been shown to simplify the diagram, additional instances of any of the components shown in FIG. 3 may exist. Components not shown in FIG. 3 may also exist to perform and provide functions and services described herein.

Figure 4:
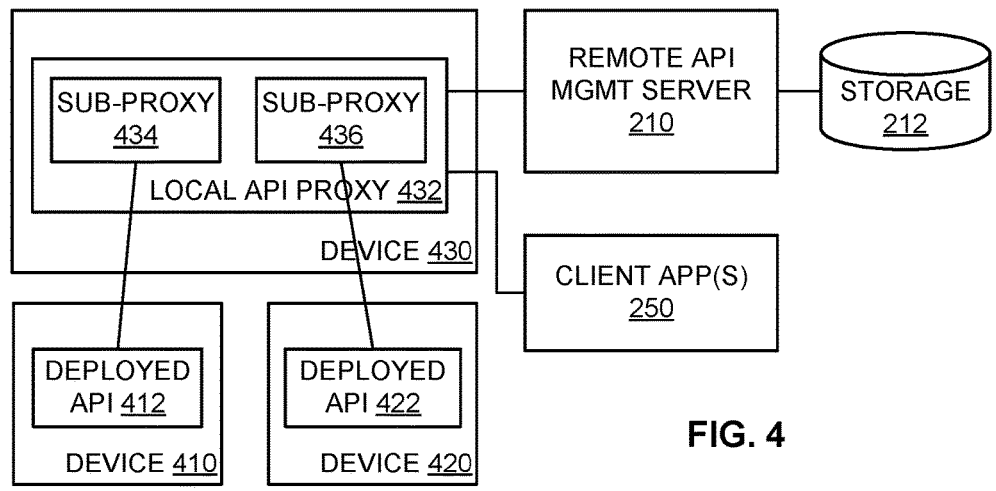
FIG. 4 is a block diagram illustrating an embodiment of a system for hybrid cloud API management including a local API proxy that accommodates a plurality of backend API implementations.

FIG. 4 is a block diagram illustrating an embodiment of a system for hybrid cloud API management including a local API proxy that accommodates a plurality of backend API implementations. The system shown in FIG. 4 includes a remote API management server 210, storage 212, one or more client apps 250, a first device 410, a second device 420, and a third device 430. Each of these components function like those described with respect to FIG. 2 unless otherwise described herein.

Device 410 includes a deployed API 412. In some embodiments, device 410 includes backend data/services (not shown) accessible via API 412. In various embodiments, the device is a data center/application environment associated with a service provider. The service provider may offer its backend data/services and product offerings on device 410. For example, a service provider can be an organization, an enterprise, an individual or group of individuals, etc.

Device 420 includes a deployed API 422. In some embodiments, device 420 includes backend data/services (not shown) accessible via API 422. In various embodiments, the device is a data center/application environment associated with a service provider. The service provider may offer its backend data/services and product offerings on device 420. For example, a service provider can be an organization, an enterprise, an individual or group of individuals, etc.

Device 430 makes backend data/services (not shown) available online for consumption by client apps 250 according to the techniques described herein. The backend data/service may be provided in at least one of device 410, device 420, and device 430. In various embodiments, the device is a data center/application environment associated with a service provider. The service provider may manage its backend data/services and product offerings using device 430. For example, a service provider can be an organization, an enterprise, an individual or group of individuals, etc.

Device 430 includes a local API proxy 432. Local API proxy 432 exposes backend data/services to client app(s) 250 via deployed API 412, 422. An example of local API proxy 432 is local API proxy 232 described with respect to FIG. 2. Local API proxy 432 includes a first sub-proxy 434 and a second sub-proxy 436.

Sub-proxies 434, 436 each accommodate diverse mechanisms for consuming services, implement security measures, and maintain these services such that they continue to function over time as services are added, modified, or deleted. In some embodiments, a sub-proxy is configured to handle certain types of API requests while another sub-proxy is configured to handle other types of API requests. In some embodiments, a sub-proxy handles specific API requests, e.g., those API requests for a specific deployed API, where the API requests may be received from various client apps. For example, sub-proxy 434 is a message processor for API 412 and sub-proxy 436 is a message processor for API 422. The message processor may be an HTTP-based message processor. In some embodiments, each of sub-proxies 434, 436 is an API runtime infrastructure deployed in device 430. In some embodiments, each of sub-proxies 434, 436 cooperates with remote API management server 210 to administer API management functionalities as further described herein. Each of the sub-proxies may be configured and deployed to provide various functions. In some embodiments, each of sub-proxies 434, 436 is configured to process requests and responses to and from backend data/services (not shown). In some embodiments, each of sub-proxies 434, 436 may be configured to asynchronously push API execution data to remote API management server 210. In some embodiments, each of sub-proxies 434, 436 provides security and/or traffic management such as spike arrest, quota, etc. as further described herein. For example, the local API proxy is configured to use a pre-definable security protocol and perform analytics on API calls (in cooperation with a remote API management server) according to the techniques described herein.

In operation, local API proxy 432 (including sub-proxies 434, 436) is installed on device 430. In some embodiments, local API proxy 432 is installed in a local deployment environment of a service provider, e.g., the local deployment environment includes devices 410, 420, and 430. For example, the installation includes configuration according to the process shown in FIG. 7. After installation, local API proxy 432 handles API requests made by client app 250 as follows. Client app 250 makes an API request. For example, the API request can be an API call. The API request is received by local API proxy 432. Local API proxy 432 determines which sub-proxy handles the API request. In one embodiment, if the API request is for API 412 and/or backend data/services accessed using API 412, local API proxy 432 forwards the request using sub-proxy 434. If the API request is for API 422 and/or backend data/services accessed using API 422, local API proxy 432 forwards the request using sub-proxy 436. In an alternative embodiment, API requests received from a first client app is handled by sub-proxy 434 and API requests received from a second client app (not shown) is handled by sub-proxy 436. Each of sub-proxies 434, 436 then forwards the API request to an appropriate deployed API. An API request may be handled according to the process shown in FIG. 8. In some embodiments, local API proxy 432 provides information (e.g., API execution data) to remote API management server 210. By way of a non-limiting example, API execution data includes what token was used to obtain access, latency, and characteristics of the API call. Remote API management server 210 processes the received information to provide analytics that may be accessible by client app 250 and/or device 430 to evaluate performance. For example, remote API management server 210 handles information received from local API proxy 432 according to the process shown in FIG. 14.

Like the other components shown in FIG. 4, device 410, device 420, and device 430 may each represent one or more physical devices. For example, remote API management server 210, device 410, device 420, device 430, and client app 250 each represent a different computer device. Any of the components shown in FIG. 4 may be integrated together with one or more other components shown in FIG. 4 and/or a component not shown in FIG. 4. Examples of device 410, device 420, and device 430 include a server, a personal computer, a desktop computer, an electronic reader, a laptop computer, a storage, a smartphone, a tablet computer, a mobile device, a wearable device, a wearable computer, and any other computer or electronic device.

The components shown in FIG. 4 may be communicatively coupled via a network (not shown). Examples of networks include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together.

In various embodiments, the components shown in FIG. 4 may exist in various combinations of hardware machines. Other communication paths may exist and the example of FIG. 4 has been simplified to illustrate the example clearly. Although single instances of components have been shown to simplify the diagram, additional instances of any of the components shown in FIG. 4 may exist. Components not shown in FIG. 4 may also exist to perform and provide functions and services described herein.

Figure 5:
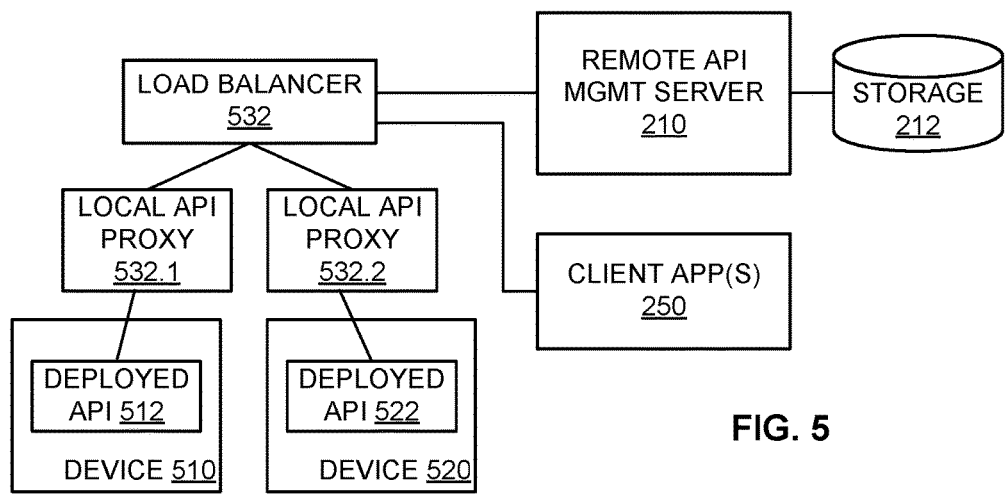
FIG. 5 is a block diagram illustrating an embodiment of a system for hybrid cloud API management including load balancing.

FIG. 5 is a block diagram illustrating an embodiment of a system for hybrid cloud API management including load balancing. The system shown in FIG. 5 includes a remote API management server 210, storage 212, one or more client apps 250, a first device 510, a second device 520, a load balancer 532, a first instance of a local API proxy 532.1, and a second instance of the local API proxy 532.2. Each of these components function like those described with respect to FIG. 2 unless otherwise described herein.

Device 510 includes a deployed API 512. In some embodiments, device 510 includes backend data/services (not shown) accessible via API 512. In various embodiments, the device is a data center/application environment associated with a service provider. The service provider may offer its backend data/services and product offerings on device 510, where the service provider may be an organization, an enterprise, an individual or group of individuals, etc.

Device 520 includes a deployed API 522. In some embodiments, device 520 includes backend data/services (not shown) accessible via API 522. In various embodiments, the device is a data center/application environment associated with a service provider. The service provider may offer its backend data/services and product offerings on device 520, where the service provider may be an organization, an enterprise, an individual or group of individuals, etc.

Load balancer 532 manages API traffic. In some instances, a single local API proxy does not efficiently or effectively handle API requests when traffic is heavy. When a single local API proxy is overloaded or to prevent the local API proxy from becoming overloaded, load balancer 532 distributes API requests to multiple instances of a local API proxy (e.g., 532.1 and 532.2 shown in FIG. 5) to balance the load on a local API proxy. For example, load balancer 532 receives requests from client app 250 and redirects traffic.

Load balancer 532 forwards requests to first instance 532.1 or second instance 532.2 of the local API proxy. Load balancer 532 may determine which instance of the local API proxy to direct traffic to based on a scheduling process. For example, the scheduling may be random, round robin, etc. Load balancer 532 may determine which instance of the local API proxy to direct traffic to based on factors such as respective loads reported by devices 510 and 520, response times, a functional state of devices 510, 520, active connections being handled by instances 532.1, 532.2 of the local API proxy, geographical location, capabilities, etc.

In some embodiments, load balancer 532 includes reverse proxying for SSL termination. For example, load balancer 532 terminates SSL connections, passing HTTPS requests as HTTP requests to the Web servers. This alleviates demand on devices 510, 520 caused by meeting the encryption and authentication requirements of an SSL request.

The first instance of the local API proxy 532.1 exposes backend data/services to client app(s) 250 via API 512. Local API proxy 232 is an example of local API proxy 532.1. The second instance of the local API proxy 532.2 exposes backend data/services to client app(s) 250 via API 522. Local API proxy 232 is an example of local API proxy 532.2.

In operation, instances of local API proxy (532.1, 532.2) are installed. In some embodiments, instances 532.1, 532.2 are installed in a local deployment environment of a service provider, e.g., the local deployment environment includes load balancer 532, instances 532.1, 532.2 of local API proxy, and devices 510, 520. For example, the installation includes configuration according to the process shown in FIG. 7. After installation, load balancer 532 handles API requests made by client app 250 as follows. Client app 250 makes an API request. For example, the API request can be an API call. The API request is received by load balancer 532. Based on a current load, the load balancer forwards the API request to first instance 532.1 of the local API proxy or second instance 532.2 of the local API proxy.

Each instance 532.1, 532.2 of the local API proxy fulfills the request by accessing its respective API and/or backend data/service (not shown). For example, an API request is handled according to the process shown in FIG. 8. In some embodiments, local API proxy instances 532.1, 532.2 provide information (e.g., API execution data) to remote API management server 210. By way of a non-limiting example, API execution data includes what token was used to obtain access, latency, and characteristics of the API call. Remote API management server 210 processes the received information to provide analytics that may be accessible by client app 250 and/or devices (not shown) to evaluate performance. For example, remote API management server 210 handles information received from local API proxy instances 532.1, 532.2 according to the process shown in FIG. 14.

Figure 6:
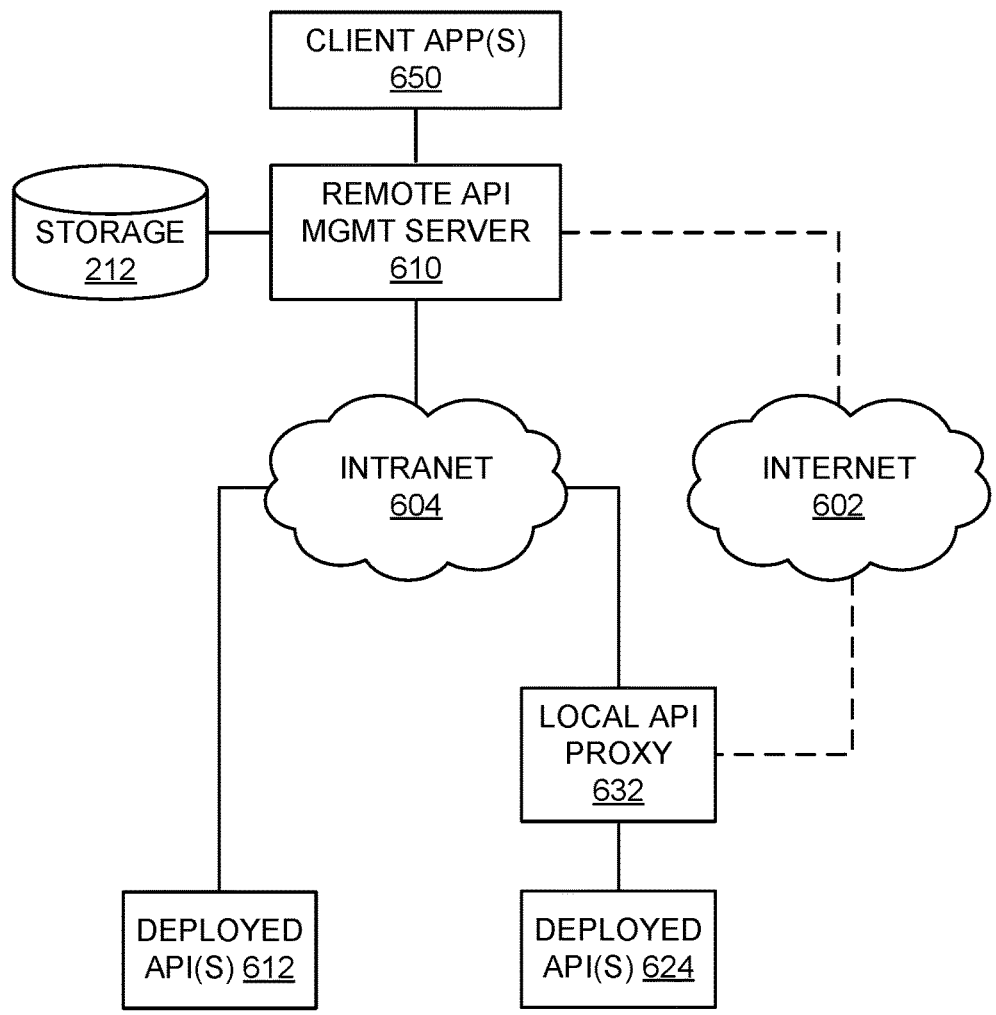
FIG. 6 is a block diagram illustrating an embodiment of a local API proxy deployed in an intranet environment.

FIG. 6 is a block diagram illustrating an embodiment of a local API proxy deployed in an intranet environment. The system shown in FIG. 6 includes a remote API management server 610, storage 212, one or more client apps 650, a local API proxy 632, intranet 604, and internet 602.

Client app 650 accesses deployed APIs (e.g., 612, 624) via remote API management server 610. An example of client 650 is client 106 shown in FIG. 1A. Client 650 is configured to send API requests to remote local API management server 610. Remote API management server 610 handles API requests made by client app 650. An example of remote API management server 610 is a component of API service platform 102 shown in FIGS. 1A and 1B. For example, unlike remote API management server 210, remote API management server 610 is configured to directly receive API requests from client apps and proxy the API requests to appropriate deployed APIs.

Deployed API 612 is directly accessible within the intranet environment of intranet 604. However, deployed API 624 is managed by local API proxy 632 and in order to access deployed 624, the access is to be proxied via local API proxy 632. Thus by using a local API proxy, certain APIs of interest may be selectively managed with specialized configurations while other APIs of the same intranet environment are not subject to the same management and configurations.

Figure 8:
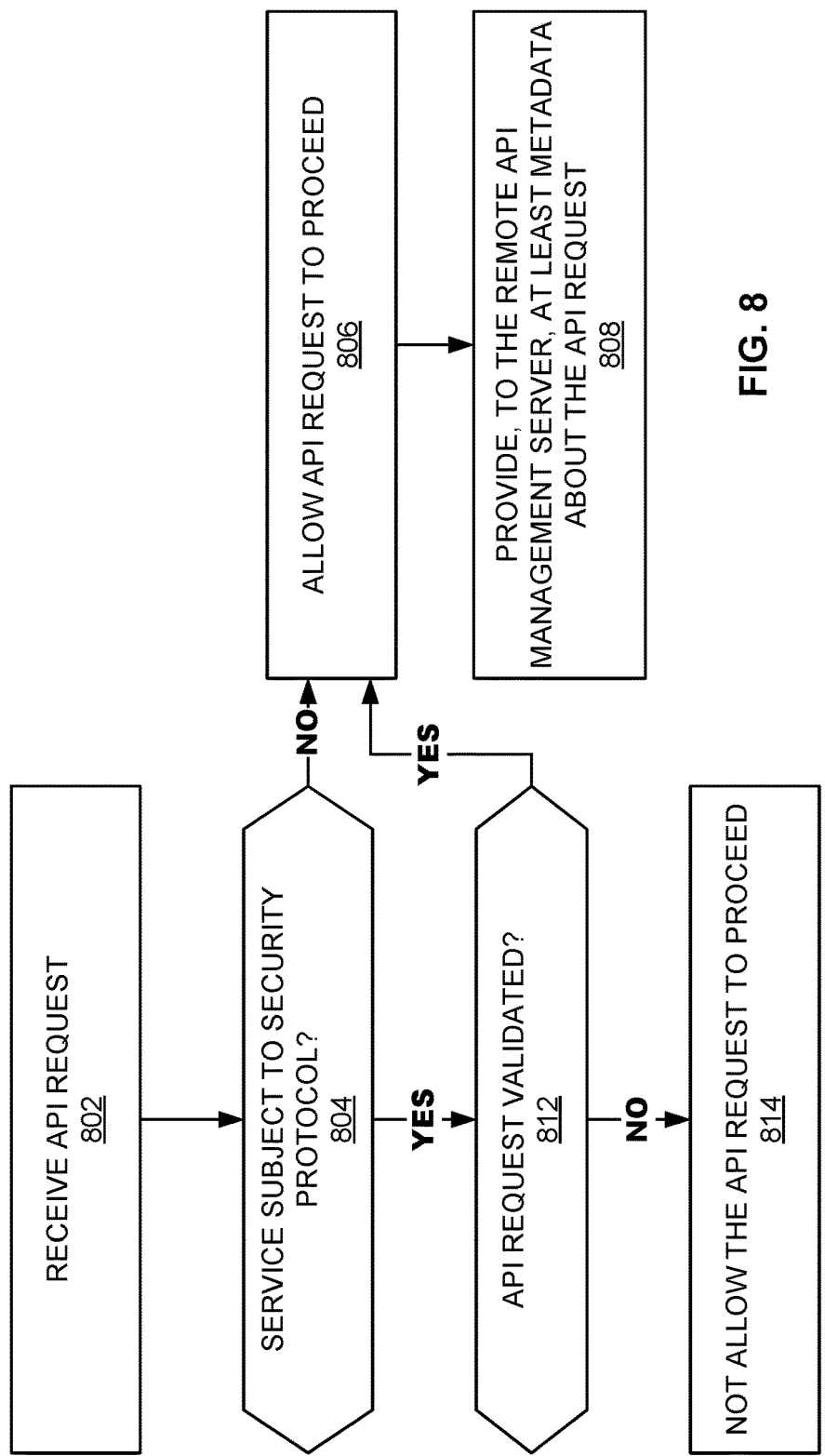
FIG. 8 is a flowchart illustrating an embodiment of a process for processing an API request.

In an example operation, client app 650 makes an API request. Some API requests may be for a deployed API protected by a local API proxy (e.g., deployed API 624). The API request is received by remote API management server 610. The remote API management server 610 determines whether the API request is for a deployed API protected by a local API proxy. If the API request is not for a deployed API protected by a local API proxy, the API request is proxied to the deployed API. Using the example shown in FIG. 6, the API request for deployed API 612 is directly passed to the deployed API. On the other hand, if the API request is for a deployed API protected by a local API proxy, the API request is forwarded to the local API proxy. The local API proxy applies a security protocol (e.g., token authentication, API credential validation, etc.), then forwards the API request to the deployed API. Using the example shown in FIG. 6, the API request for deployed API 624 is forwarded to local API proxy 632. Local API proxy 632 applies one or more API management functions, then forwards the API request to deployed API 624. An example process for handling an API request by local API proxy 632 is shown in FIG. 8.

Figure 14:
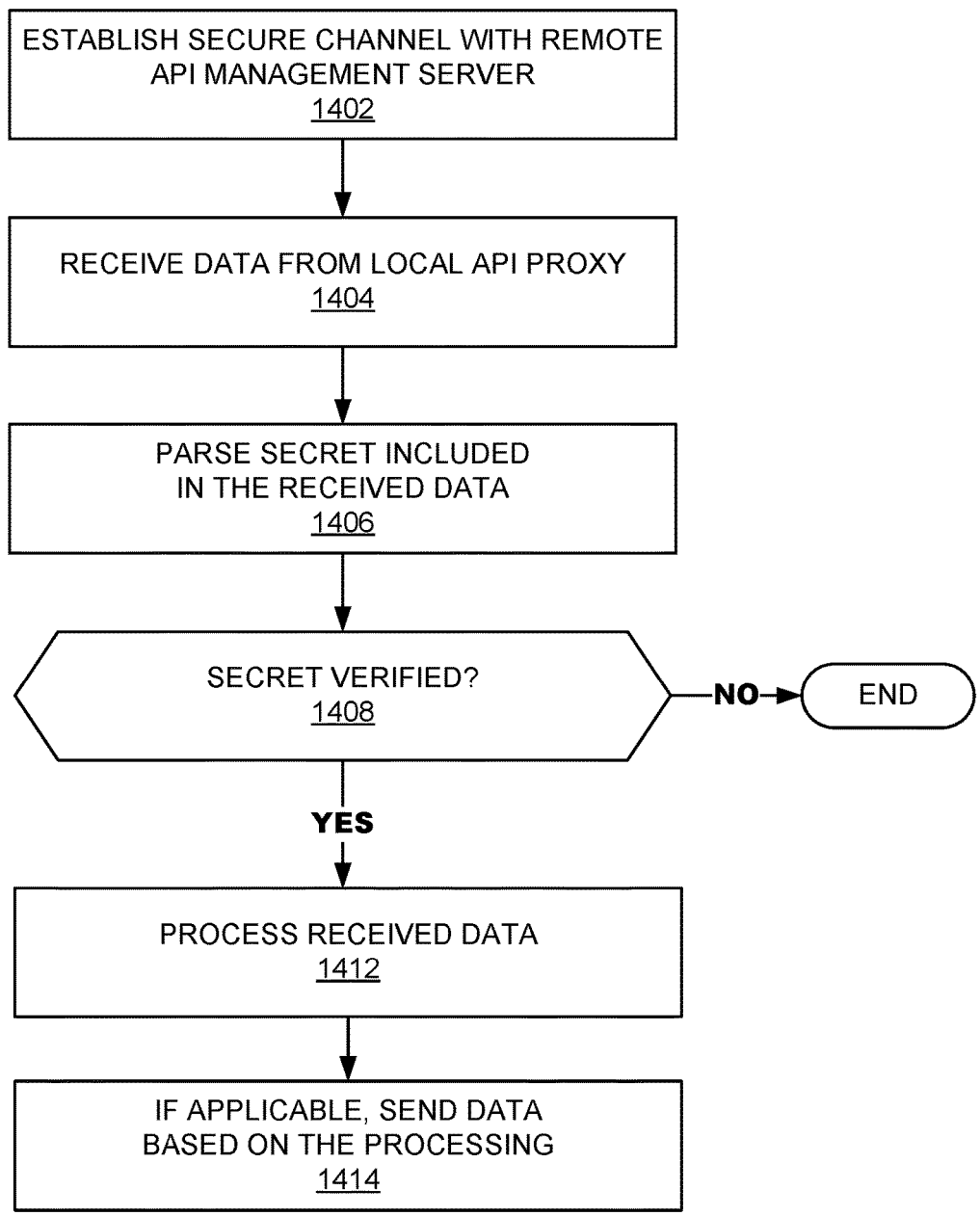
FIG. 14 is a flowchart illustrating an embodiment of a process for handling an API request including a credential for authentication.

In some embodiments, local API proxy 632 sends metadata to the remote API management server 610 via internet 602 regarding information about handling of API requests and responses. An example process for communications between local API proxy 632 and remote API management server 610 is shown in FIG. 14. Internet 602 is a public network such as a multiregional system of interconnected computer networks that use an Internet protocol suite (e.g., TCP/IP) to link various devices. The public network can include various electronic, wireless, and optical networking technologies. Intranet 604 is a private network accessible to pre-defined devices, e.g., devices associated with an organization. For example, the intranet may be a company-wide intranet that provides a point of access to internal and/or external resources. Example intranets include local area networks (LANs) and wide area networks (WANs).

Figure 7:
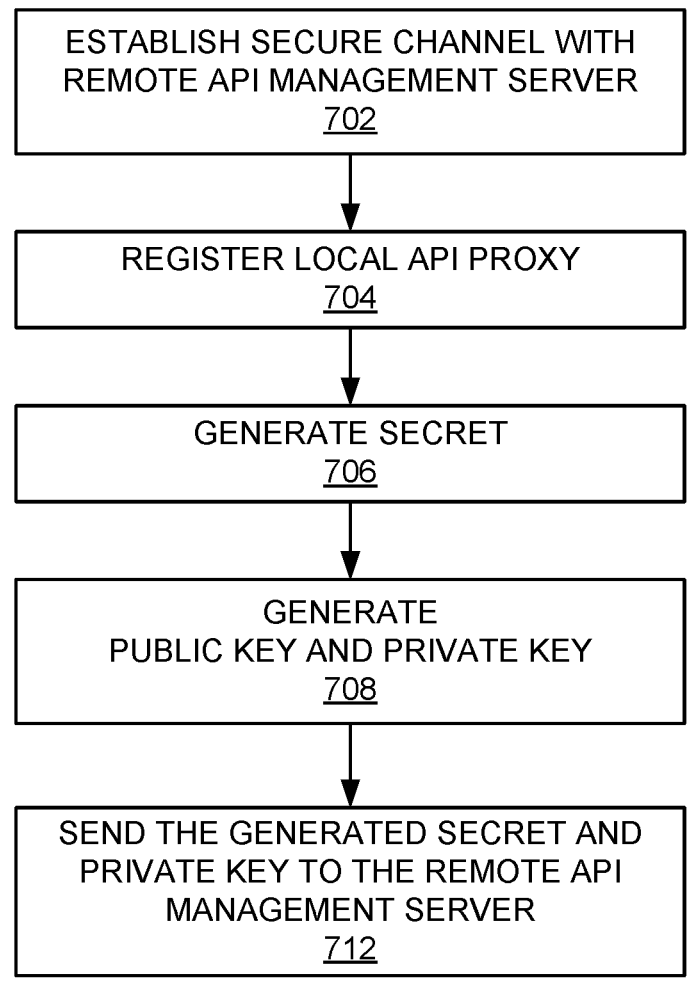
FIG. 7 is a flowchart illustrating an embodiment of a process for registering a local API proxy with a remote API management server.

FIG. 7 is a flowchart illustrating an embodiment of a process for registering a local API proxy with a remote API management server. The process of FIG. 7 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 7 is performed using a processor, e.g., a processor implemented by a single-chip or by multiple processors.

At 702, a secure channel is established with a remote API management server. For example, the secure channel is established between local API proxy 232 and remote API management server 210 shown in FIG. 2. In some embodiments, establishing the secure channel includes establishing an encrypted communication connection. For example, a Transport Layer Security (TLS) based connection (e.g., HTTPS connection) is established. In some embodiments, 702 is performed automatically at startup when the local API proxy is powered on. In some embodiments, 702 is performed in response to a command made by a user, for example, via a command line interface (CLI).

At 704, the local API proxy is registered. Registration of the local API proxy associates the local API proxy with the remote API management server for subsequent processes. In some embodiments, registration includes validating the local API proxy and/or the remote server. For example, identification, configuration, and/or authentication information about the local API proxy is provided to the remote API management server. The identification information may include a local API proxy ID. Configuration information may include identification of how API requests are handled including network configuration details. Authentication information includes identification for determining that a local API proxy is a valid API proxy such as a secret, user identifier/password pair, and the like. In some embodiments, registration includes preparing the local API proxy and/or the remote API management server to handle API requests according to various protocols, e.g., according to the process shown in FIG. 8. The protocols may include one or more standard protocols and/or custom protocols such as self-authenticating token, API credential, etc.

At 706, a secret is generated. For example, a secret includes a user ID/password combination, encryption key, secret data, or any other information that can verify an identity of the local API proxy in subsequent communications with the remote API management server. In some embodiments, the secret is generated for each local API proxy instance. The secret is unique for each local API proxy instance so that communications between a particular local API proxy instance and the remote API management server are authenticated using the secret. An example process of authenticating a local API proxy is further described herein, e.g., with respect to FIG. 14.

At 708, a public key and a private key are generated. Public and private keys can be paired encryption keys such that one key can be used to sign a token while the other key can be used to authenticate the signature of the signed token. In some embodiments, a self-authenticating token is signed with the private key, and the signed token can be authenticated as being signed by a valid source using the public key. The content of the token identifies associated API access privileges. For example, the private key is used to sign the token, where the token is generated by a remote API management server. When an API call is made, the token is passed by the caller to the local API proxy. The local API proxy validates the API call using the token. In particular, the local API proxy recognizes (by using the public key) the private key signature and authenticates the token accordingly. In this manner, the local API proxy can validate an API call independently, e.g., without consulting the remote API management server. Using this technique, an API call can be validated even when a connection between the local API proxy and the remote API management server is unavailable or unreliable. Example processes of requesting a token, generating (and signing) a token, and authenticating an API call using the token are further described herein, e.g., with respect to FIGS. 9-11.

At 712, the secret and the private key are sent to the remote API management server. The secret was generated in 706 and the private key was generated in 708. In some embodiments, at least part of the information generated at 706 and 708 is associated with the local API proxy and stored by the remote API management server. This information may be used by the remote API management server for subsequent processes. For example, the private key is used by the remote API management server to sign a self-authenticating token, where the token is useful to validate an API request. As another example, the secret is used by the remote API management server to authenticate a communication from the local API proxy.

In some embodiments, one or more security frameworks for the local API proxy can be provided automatically at configuration time in response to user selection from among several options. The security framework/protocol can guide interactions between the local API proxy and clients making API calls. Security protocols include self-authenticating token, API credential, and the like. For example, a self-authenticating token protocol uses a token to validate an API request locally without needing to communicate with a remote API management server at the time of validation, as further described herein, e.g., with respect to FIGS. 9-11. An API credential protocol uses a credential to validate an API request with the aid of a remote API management server, as further described herein, e.g., with respect to FIGS. 12 and 13.

In some embodiments, at configuration time, a plugin may be installed at the local API proxy to modify a request and response flow. A plugin may provide various functions, e.g., one or more security frameworks, support for remote API management server analytics, and rate limiting features. Rate limiting features include quota, spike arrest, and the like. For example, a spike arrest plugin protects against traffic spikes by throttling the number of requests processed by a local API proxy instance. Using spike arrest can protect a deployed API/backend data/services against traffic spikes and/or denial of service attacks. As another example, the quota plugin specifies the number of request messages that a client app is permitted to submit to an API over a specified time interval (e.g., minutes or hours). Using a quota can limit the number of connections client apps make to a deployed API/backend data/services. In some embodiments, plugin modules follow a consistent pattern and are stored in a location known to the local API proxy, enabling the local API proxy to discover and load plugins automatically. An example process for processing an API request according to a quota is further described herein, e.g., with respect to FIG. 15. A user may write a custom plugin to modify a request and response flow in Node.js to define behavior of the local API proxy.

In some embodiments, the configuration process shown in FIG. 7 is performed according to rules in a configuration file. The configuration file may be downloaded at configuration time or cached. For example, the local API proxy may use a cached configuration file if the local API proxy (re)starts with no connection to the remote API management server.

In some embodiments, an option is provided at configuration time to start the local API proxy in cluster mode. In cluster mode, a Node.js cluster module is used to spawn worker processes, which may balance load in some instances.

FIG. 8 is a flowchart illustrating an embodiment of a process for processing an API request. The process of FIG. 8 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 8 is performed by a processor, e.g., a processor implemented by a single-chip or by multiple processors.

At 802, an API request is received. In some embodiments, the API request includes credentials such as a user identification and password or secret for remote API management server authentication. In some embodiments, an API request includes a self-authenticating token. In some embodiments, the local API proxy begins servicing the API request locally. By servicing the API request locally, the local API proxy is compliant with security regulations that require certain types of data or API calls to be handled locally. In some embodiments, in response to receipt of the API request, it is determined where to send the API request. Using the example of FIG. 2, the determination includes identifying a location of API 234 and/or backend data/service. Using the example of FIG. 3, the determination includes identifying a location of API 234 and/or backend data/service, which is external to the device in which local API proxy 232 is provided. Using the example of FIG. 4, the determination includes identifying a location of API 412 or API 422, which are provided in different devices. Using the example of FIG. 5, the determination includes identifying, by load balancer 532, a location of API 512 or API 522, which are provided in different devices. Using the example of FIG. 6, the determination includes identifying a location of API 624, which is provided in a device (not shown) or identifying a location of API 612 which is accessible via intranet 604.

Returning to FIG. 8, at 804, it is determined whether service is subject to a security protocol. For example, servicing the API request is subject to a security protocol if a mechanism such as a self-authenticating token or an API credential is to be used to determine whether to allow the API request to proceed. In some embodiments, the security protocol is indicated by the API request including a token and/or an API credential. In some embodiments, a local API proxy is capable of handling security protocols by having an enabled plugin that is installed at configuration time as further described herein, e.g., with respect to FIG. 7. If service is not subject to a security protocol, the API request is allowed to proceed (806). If service is subject to a security protocol, it is determined whether the API request is validated (812).

At 812, it is determined whether the API request is validated.

Figure 10:
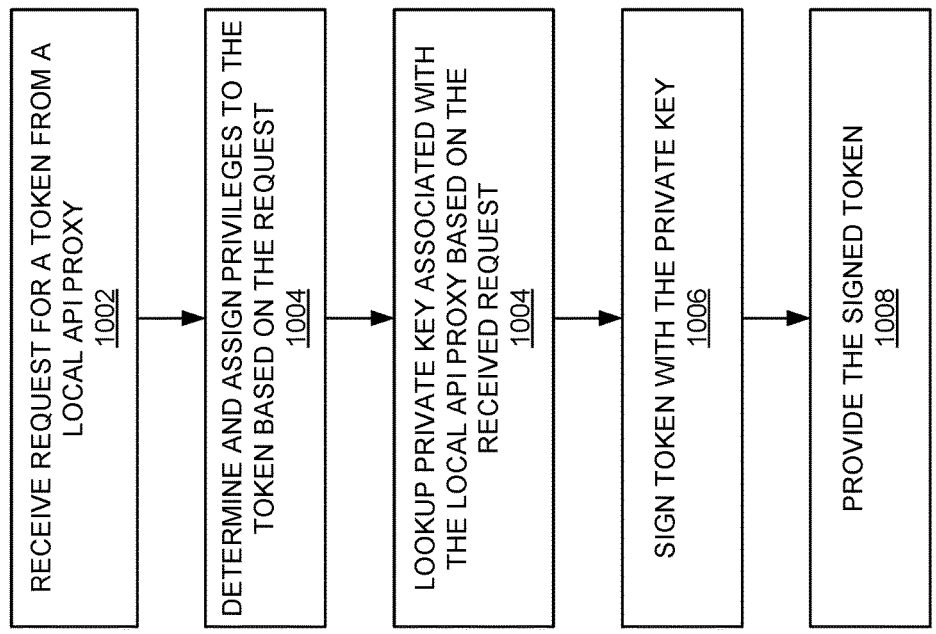
FIG. 10 is a flowchart illustrating an embodiment of a process for generating and signing a token.
Figure 9:
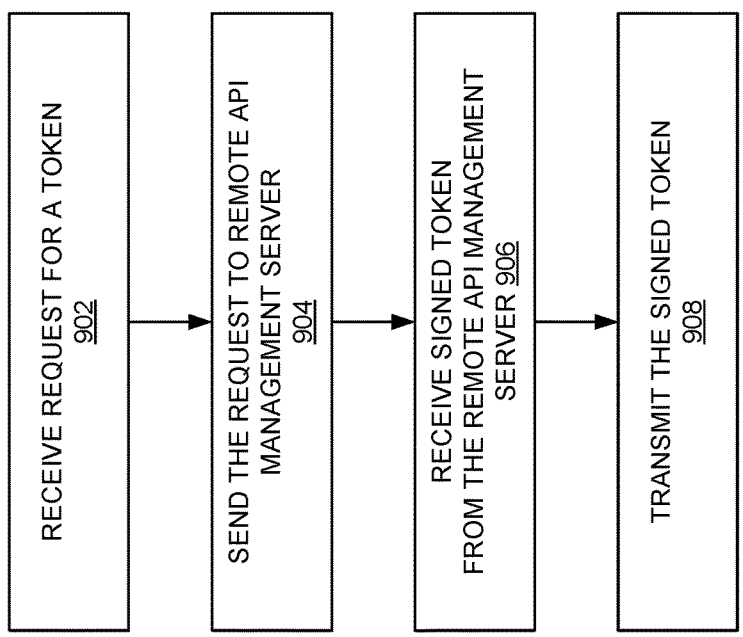
FIG. 9 is a flowchart illustrating an embodiment of a process for requesting and receiving a token.

A self-authenticating token security protocol enables a local API proxy to locally validate an API request without consulting the remote API management server at the time of validation. For example, OAuth2 is a protocol using a self-authenticating token in which a JSON Web Token (JWT) is used to validate an associated API request. The local API proxy need not communicate with remote API management server 210 to validate the client app making the request. A signature of the token is checked to validate the API request. Example processes for authentication using a token are shown in FIGS. 9-11.

An API credential security protocol enables a local API proxy to validate an API request by consulting a remote API management server. The credential, e.g., a certificate, a user identification and/or password, a secret and the like, identifies a client app making the API request. For example, an API key is a protocol using a credential in which a consumer key and secret pair is generated for a client app. The consumer key is unique to a client app (e.g., organization) and is embedded in the client app and stored by a remote server. The client app presents the consumer key with an API request and the remote server verifies the consumer key before allowing the API request to proceed. Example processes for authentication using API credentials are shown in FIGS. 12 and 13.

If the API request is validated at 812, the API request is allowed to proceed (806). Otherwise, if the API request is not validated at 812, the API request is not allowed to proceed (814). That is, the API request is not allowed to proceed to a backend target and/or is not forwarded to a deployed API. In some embodiments, the process shown in FIG. 8 simply terminates without further processing the API request. In some embodiments, when the API request is not allowed to proceed, this status is communicated to the client app. The client app may respond by providing another form of authentication (e.g., token, credential, etc.) to attempt to validate the API request. In some embodiments, multiple security mechanisms are provided with the API request (e.g., token and credential). When one security mechanism fails to allow the API request to proceed, another security mechanism can be used to validate (e.g., 812 is repeated for the other security mechanism).

At 806, an API request proceeds to a deployed API, e.g., is proxied/forwarded to the corresponding deployed API. That is, the local API proxy is utilized to service the API request at the local deployment environment (e.g., the environment of device 230 shown in FIG. 2). In some embodiments, allowing the API request to proceed includes a deployed API fulfilling the API request by accessing backend data/services.

At 808, at least metadata about the API request is provided to the remote API management server. In some embodiments, the at least metadata is provided over a secure channel and according to the process shown in FIG. 14. In some embodiments, the metadata is provided asynchronously, synchronously, periodically, or when requested with respect to the processing of the API request. One example is asynchronously/periodically sending metadata. This allows the remote API management server to provide analytics without the costly local infrastructure. The asynchronous nature of the metadata transmission also prevents delay in processing and provides a streamlined experience for a user.

FIG. 9 is a flowchart illustrating an embodiment of a process for requesting and receiving a token. The process of FIG. 9 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 9 is performed by a processor, e.g., a processor implemented by a single-chip or by multiple processors. In some embodiments, at least a portion of the process of FIG. 9 is performed before 802 of FIG. 8. In some embodiments, at least a portion of the process of FIG. 9 is included in 802 of FIG. 8.

At 902, a request for a token is received. The token is a self-authenticating security mechanism for API requests, e.g., as follows. When an API request is made, the token is included to allow a local API proxy to validate the API request without needing to communicate with a remote server. The token verifies a specific API request that can be made with the token. For example, the token has associated privileges identifying that a requestor or group of requestors is permitted to use the token. The request for the token may include identification information about the requestor such as a name of a client app, an API request or group of API requests, an organization name, an environment name, etc. The request may include validating information about the requestor such as a user identifier and password, secret, etc. The request for the token may be made at any time before an API request is made. For example, the request may be made before making an API request or before making a group of API requests. In some embodiments, the request is made by a client app, e.g., client app 250 shown in FIG. 2. In some embodiments, the request is made via a command line interface (CLI).

At 904, the request is sent to a remote API management server. The remote API management server responds to the request by generating a token and signing the token with a secret. In some embodiments, the secret is generated at configuration by a local API proxy, as further described herein with respect to FIG. 7.

At 906, the signed token is received from the remote API management server. The signed token may be transmitted by the remote API management server over a network and received by the local API proxy. An example process for generating the signed token is shown in FIG. 10.

At 908, the signed token is transmitted. The signed token is transmitted to a client app and is usable by the client app in subsequent API requests. In some embodiments, the signed token is self-authenticating and includes associated privileges. The token is used to validate an API request, e.g., according to the process shown in FIG. 11.

FIG. 10 is a flowchart illustrating an embodiment of a process for generating and signing a token. The process of FIG. 10 may be at least in part implemented on one or more components of a remote API management server, e.g., 210 shown in FIGS. 2-5 and 610 shown in FIG. 6. In some embodiments, the process shown in FIG. 10 is performed using a processor, e.g., a processor implemented by a single-chip or by multiple processors. In some embodiments, at least a portion of the process of FIG. 10 is performed in response to 902 shown in FIG. 9.

At 1002, a request for a token is received from a local API proxy. The requested token does not require a connection to a remote API management server from the local API proxy in order to authenticate the identity and/or privileges associated with the token. The request may include identification information about the requestor such as a name of a client app, an API request or group of API requests, an organization name, an environment name, etc. The request may include validating information about the requestor such as a user identifier and password, secret, etc.

At 1004, privileges are determined and assigned to the token based on the request. Privileges define access permissions and parameters associated with the token. That is, privileges can customize validation. For example, privileges may include a duration for which the token is valid (e.g., an expiration time), a quota such as number of API requests that can be made with the token, specific API requests allowed to be made with the token, etc. Privileges for the token are determined based on the received token request. For example, the remote API management server determines privileges to be allowed for the particular client app. Subsequent to the privileges being determined, the privileges are assigned to the token. The assigned privileges are associated with the token such that when a token is used, the associated privileges are also provided.

At 1006, a private key associated with the local API proxy is looked up based on the received request. The private key can be generated by the local API proxy at configuration, e.g., according to 708 shown in FIG. 7. The private key signs the token as follows. A token is self-authenticating, enabling a local API proxy to validate an API request accompanying the token without communicating with a remote API management server at the time of validation. In some embodiments, the token is signed by a private key specific to a local API proxy such that the local API proxy can later authenticate the token. Other local API proxies are unaware of that unique private key and therefore cannot validate the token. In some embodiments, the association of the private key with the local API proxy is stored in the remote API management server, e.g., remote API management server 210 shown in FIG. 2. In some embodiments, the association of the private key with the local API proxy is stored in a storage accessible by a remote API management server, e.g., storage 212 shown in FIG. 2.

At 1008, the token is signed with the private key. Later, the signature (private key) can be used by the local API proxy to authenticate the token. The token can be signed according to public key cryptography in which the token is hashed to produce a digest and the digest is encrypted with the private key to produce a digital signature. To later verify the signature, the local API proxy computes a hash of the token, decrypts the signature with the signer's public key, and compares the computed digest with the decrypted digest. If the digests match, then the token was unmodified since the time it was signed. An example process of handling an API request accompanied by a token is shown in FIG. 11.

At 1012, the signed token is provided. The signed token is transmitted to the local API proxy. In some embodiments, the local API proxy transmits the signed token to a client app that originally requested the token. The token is usable by the client app in subsequent API requests. In some embodiments, the signed token is self-authenticating and has associated privileges. The token is used to validate an API request, e.g., according to the process shown in FIG. 11.

FIG. 11 is a flowchart illustrating an embodiment of a process for handling an API request including a token for validation. The process of FIG. 11 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 11 is performed by a processor, e.g., a processor implemented by a single-chip or by multiple processors. In some embodiments, at least a portion of the process of FIG. 11 is performed as part of 802-812 of FIG. 8. In some embodiments, at least a portion of the process of FIG. 11 is performed after at least a portion of the process of FIG. 7 is performed. In some embodiments, at least a portion of the process of FIG. 11 is performed after at least a portion of the process of FIG. 8 is performed.

At 1102, an API request is received. The API request may be a query for information provided by an API and/or backend data/services serviced by an API. Using the example shown in FIG. 2, the API request may be made by client app 250 for API 234 and/or a backend data/service. In some embodiments, the API request includes a token, credential, or other security mechanism for securing transactions involving the API request.

At 1104, it is determined that the API request includes a token. The token may be extracted from part of the API request, e.g., in a header. The token is a mechanism for securing transactions involving the API request. In some embodiments, the token is a self-authenticating token generated in response to a request, e.g., according to the example processes shown in FIGS. 9 and 10. In some embodiments, the token is authenticated by authenticating the signature using the public key. For example, the local API proxy computes a hash of the token, decrypts the signature with the signer's public key, and compares the computed digest with the decrypted digest. If the digests match, then the token was unmodified since the time it was signed.

At 1106, the token is locally validated using a public key. The token can be authenticated locally without communicating with a remote API management server. In some embodiments, the token is authenticated with the public key by reading the token using the public key. Reading the token includes identifying a signature of the token. The token can be authenticated by matching a signature of the token with a private key generated by the local API proxy, where the private key is generated at configuration time. In other words, if the signature matches a private key associated with the local API proxy, the token is authenticated. If the signature does not match a private key associated with the local API proxy, the token is not authenticated. For example, a public key and private key may be generated according to the process shown in FIG. 7. That is, even when a connection between a local API proxy and a remote API management server is unavailable or unreliable, the token can be authenticated.

If the token is not authenticated, at 1108, the API request is not allowed to proceed. In some embodiments, when the API request is not allowed to proceed, this status is communicated to the client app. The client app may respond by providing another form of authentication (e.g., another token, a credential, etc.) to attempt to validate the API request. In some embodiments, multiple security mechanisms are provided with the API request (e.g., token(s) and credential(s)). When one security mechanism fails to allow the API request to proceed, another security mechanism can be used to validate (e.g., the process of FIG. 12 is performed to attempt authentication with an API credential).

If the token is authenticated, at 1112 it is determined whether the API request is allowed based on privileges associated with the token. As described herein, privileges define access permissions and parameters associated with the token. That is, privileges can customize authentication. For example, privileges may include a duration for which the token is valid (e.g., an expiration time), a quota such as number of API requests that can be made with the token, specific API requests allowed to be made with the token, etc.

If the API request is allowed at 1112, the API request is allowed to proceed at 1114. Otherwise, if the API request is not allowed to proceed at 1112, the API request is not allowed to proceed at 1116.

FIG. 12 is a flowchart illustrating an embodiment of a process for handling an API request including a credential for authentication. The process of FIG. 12 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 12 is performed by a processor, e.g., a processor implemented by a single-chip or by multiple processors. In some embodiments, at least a portion of the process of FIG. 12 is performed as part of 802-812 of FIG. 8. In some embodiments, at least a portion of the process of FIG. 12 is performed after at least a portion of the process of FIG. 7 is performed.

At 1202, an API request is received. The API request may be a query for information provided by an API and/or backend data/services serviced by an API. Using the example shown in FIG. 2, the API request may be made by client app 250 for API 234 and/or backend data/service. In some embodiments, the API request includes a key or other security mechanism for securing transactions involving the API request.

At 1204, it is determined that an API request includes a credential. The credential is a mechanism for securing transactions involving the API request. In some embodiments, the credential identifies the bearer of the credential (e.g., user identifier/password pair, secret, etc.) without identifying access privileges of the credential-bearer. In some embodiments, authentication by consulting the remote server is an alternative to token validation (e.g., processes of FIGS. 9-11). In some embodiments, authentication by consulting the remote API management server provides robust security while allowing for a lightweight local API proxy.

At 1206, authentication is requested from a remote API management server using the credential. The remote API management server enforces access to a deployed API by allowing or not allowing an API request to proceed based on the credential. For example, a local API proxy provides to the remote API management server a credential and an identification of an API request. An example process of a remote API management server determining whether an API request is allowed is shown in FIG. 13.

At 1208, it is determined whether the remote API management server validated the API request. In some embodiments, authentication of the API request includes determining whether the API request meets thresholds defined by a quota, spike arrest, and the like. For example, even where the API requestor is validated, the API request is not validated based on network traffic (e.g., if a quota is exceeded).

If the API request is validated at 1208, the API request is allowed to proceed at 1212. Otherwise, if the API request is not validated at 1208, the API request is not allowed to proceed at 1214.

FIG. 13 is a flowchart illustrating an embodiment of a process for handling an API request including a credential for authentication. The process of FIG. 13 may be at least in part implemented on one or more components of a remote API management server, e.g., 210 shown in FIGS. 2-5 and 610 shown in FIG. 6. In some embodiments, the process shown in FIG. 13 is performed using a processor, e.g., a processor implemented by a single-chip or by multiple processors. In some embodiments, at least a portion of the process of FIG. 13 is performed in response to 1202 shown in FIG. 12.

At 1302, an authentication request is received. For example, the authentication request is provided by a local API proxy as shown in 1206 of FIG. 12. In some embodiments, the authentication request includes an identification of an API request, where the API request is a request for a deployed API and/or backend data/services. In some embodiments, the request includes a credential. The credential, e.g., a certificate, a user identification and/or password, a secret, an API key and the like, identifies a client app making the API request.

At 1304, privileges associated with the credential and/or the API request are looked up. The lookup may be a search for the privileges in a database or access policy. In some embodiments, the privileges are determined during configuration and/or during runtime, e.g., based on 1414 of FIG. 14. For example, privileges define access permissions and parameters associated with a credential and/or an API request. For example, privileges may include a duration for which the credential is valid (e.g., an expiration time), a quota such as number of API requests that can be made with the credential, specific API requests allowed to be made with the credential, etc. In some embodiments, the remote API management server automatically determines privileges to be allowed for the particular client app. In some embodiments, an administrator assigns privileges to a credential. The privileges may be stored in a remote API management server or storage associated with the remote API management server, e.g., storage 212 shown in FIG. 2. At 1304 the association is looked up.

At 1306, it is determined whether the API request is allowed. The determination is based on whether the API request falls within the privileges granted to the credential accompanying the API request.

At 1308, the determination of whether the API request is allowed is provided. The determination is usable by a local API proxy to determine whether an API request is allowed to proceed, e.g., according to 1208 shown in FIG. 12. In some embodiments, when the API request is not allowed to proceed, this status is communicated to the client app. The client app may respond by providing another form of authentication (e.g., token, another credential, etc.) to attempt to validate the API request. In some embodiments, multiple security mechanisms are provided with the API request (e.g., token(s) and credential(s)). When one security mechanism fails to allow the API request to proceed, another security mechanism can be used to validate.

FIG. 14 is a flowchart illustrating an embodiment of a process for handling an API request including a credential for authentication. The process of FIG. 14 may be at least in part implemented on one or more components of a remote API management server, e.g., 210 shown in FIGS. 2-5 and 610 shown in FIG. 6. In some embodiments, the process shown in FIG. 14 is performed using a processor, e.g., a processor implemented by a single-chip or by multiple processors.

At 1402, a secure channel is established with a remote API management server. For example, the secure channel is established between local API proxy 232 and a remote API management server 210 shown in FIG. 2. In some embodiments, establishing the secure channel includes establishing an encrypted communication connection. For example, a Transport Layer Security (TLS) based connection (e.g., HTTPS connection) is established. In some embodiments, the local API proxy establishes the connection. In some embodiments, the remote server establishes the connection.

At 1404, data is received from a local API proxy. The data may include metadata regarding one or more API requests. For example, the data may include information about how an API request made by a client app is handled. For example, the data includes client apps that made API requests, deployed APIs that were requested, backend data/services that were requested, types of API requests that were made, whether an API request was allowed, when API requests were made, response times to the API requests (latency), usage/load of a local API proxy, what token/credential was used to obtain access, and the like. The data may be used by the remote API management server for analytics, security, and the like.

At 1406, a secret, which is included in the received data, is parsed. The secret may be included in a header of a packet of data. The secret is extracted by parsing the received data. In some embodiments, the secret was the secret generated and sent by the local API proxy in 706 of FIG. 7.

At 1408, the secret is verified. In some embodiments, the secret is verified by comparing the secret with information stored by the remote API management server. For example, the stored information is an association of the secret with the local API proxy made at configuration, e.g., according to the process of FIG. 7. The secret is compared with a stored secret associated with the identified sender. If there is a match, the secret is verified. Otherwise, if there is not a match, the secret is not verified.

If the secret is verified at 1408, the received data is processed at 1412. The data can be processed in a variety of ways. For example, processing includes providing API services, analytics services, developer services, and the like as further described herein.

At 1414, data based on the processing is sent, if applicable. In some embodiments, data includes commands regarding how to handle API requests. For example, commands define privileges of access and/or rate limits, enforcing a quota, spike arrest, and the like. For example, even where the API requestor is validated, the API request is not validated based on network traffic (e.g., consumed quota, level of local API proxy usage, etc.). For example, it may be applicable to send data if privileges have changed such that access is revoked/modified so that a particular client application no longer has access to the API/backend services.

The process shown in FIG. 14 may be used to transmit data between the local API proxy and the remote API management server. For example, the process may be used by the local API proxy to transmit at least metadata regarding API requests. The transmissions may be asynchronous as further described herein. FIG. 14 shows an example of one-way SSL. Alternatively, communications between the local API proxy and the remote API management server may be by mutual SSL.

Figure 15:
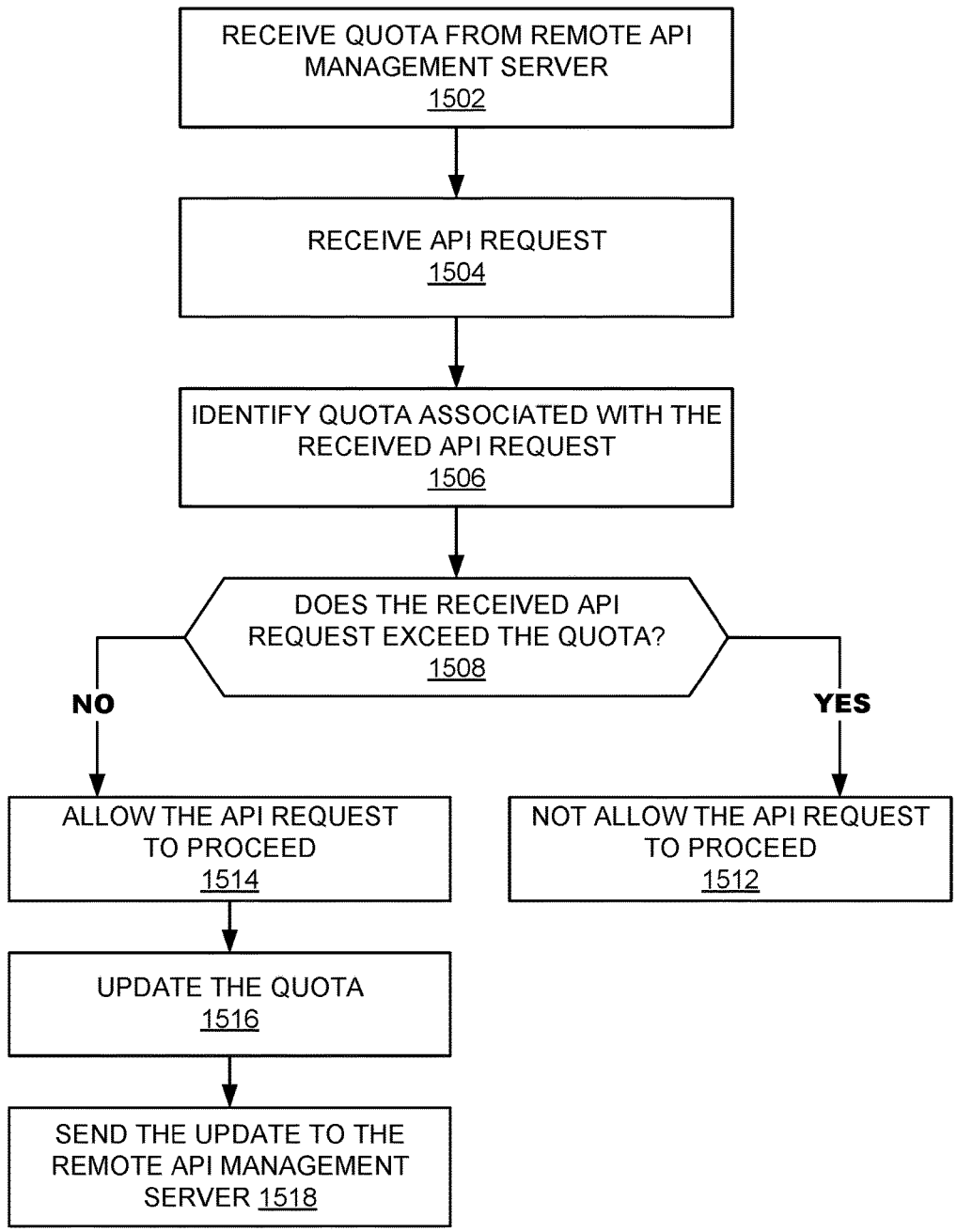
FIG. 15 is a flowchart illustrating an embodiment of a process for handling an API request including implementing a quota.

FIG. 15 is a flowchart illustrating an embodiment of a process for handling an API request including implementing a quota. The process of FIG. 15 may be at least in part implemented on one or more components of a local API proxy (e.g., 232 shown in FIG. 2, 432 shown in FIG. 4, 532.1/532.2 shown in FIG. 5, and 632 shown in FIG. 6). In some embodiments, the process shown in FIG. 15 is performed using a processor, e.g., a processor implemented by a single-chip or by multiple processors. In some embodiments, at least a portion of the process of FIG. 15 is performed as part of 802-812 of FIG. 8. In some embodiments, at least a portion of the process of FIG. 15 is performed after at least a portion of the process of FIG. 7 is performed.

At 1502, a quota is received from a remote API management server. The quota may define a rate limiting operation to manage network traffic. For example, if a number/rate of API requests exceeds a quota, subsequent API requests are not allowed. The quota may be defined with respect to specific API requests, a group of API requests, specific users/client apps, a group of users/client apps, an absolute number, a rate, a data transfer size, time, etc.

At 1504, an API request is received. The API request may be a query for information provided by an API and/or backend data/services serviced by an API. Using the example shown in FIG. 2, the API request may be made by client app 250 for API 234 and/or backend data/service.

At 1506, a quota associated with the received API request is identified. For example, the quota may be automatically determined and stored in association with a particular type of API request by a remote API management server, e.g., storage 212 shown in FIG. 2. The quota is identified by retrieving the stored quota value from the remote API management server.

At 1508, it is determined whether the received API request exceeds the quota. The quota may be tracked by a counter such that each time (or every few times) an API request is made, the counter is updated (incremented or decremented). If the received API request causes the counter to be updated such that a threshold is exceeded, then the quota is exceeded.

If the received API request exceeds the quota, the API request is not allowed to proceed at 1512. That is, the API request is not allowed to proceed to a backend target, is not serviced locally, and is not serviced with the aid of a remote API management server. In some embodiments, the process shown in FIG. 15 simply terminates without further processing the API request. Otherwise, if the received API request does not exceed the quota, at 1514 the API request is allowed to proceed.

At 1516, the quota is updated. For example, a counter associated with the quota is updated by incrementing or decrementing based on whether an API request is serviced.

At 1518, the update is sent to the remote API management server. In some embodiments, the updated quota is sent to the remote API management server where the quota is tracked and enforced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    providing, by a local API proxy deployed at a local deployment environment, a key to a remote API management server that is not deployed at the local deployment environment;
    receiving, at the local API proxy, a first request from an application for a token that authorizes the application to utilize the local API proxy to service API requests;
    in response to receiving the first request, providing, by the local API proxy and to the remote API management server, a second request for the token where the second request identifies the local API proxy and the application;
    receiving, from the remote API management server and in response to the second request, the token, where the token includes access permissions for the application signed by the key provided to the remote API management server by the local API proxy;
    providing the token to the application as a response to the first request;
    receiving, from the application and at the local API proxy deployed at the local deployment environment, an API request that includes the token;
    determining whether the token in the API request is valid based on whether the token is signed by the remote API management server with the key provided by the local API proxy to the remote API management server;
    in response to determining that the token is valid, utilizing the local API proxy to service the API request at the local deployment environment;
    establishing a connection with the remote API management server after the API request is serviced by the local API proxy; and
    providing to the remote API management server, via the connection, at least metadata about the API request.

2. The method of claim 1, wherein the servicing the API request includes proxying the API request to a server in the local deployment environment.

3. The method of claim 1, wherein a plurality of local API proxies are managed by the remote API management server.

4. The method of claim 1, further comprising configuring the local API proxy, wherein configuring the local API proxy includes registering the local API proxy with the remote API management server.

5. The method of claim 1, wherein the providing at least the metadata includes communicating with the remote API management server using a pre-exchanged secret.

6. The method of claim 1, wherein the metadata includes metadata about a plurality of API requests.

7. The method of claim 1, wherein the metadata is used by the remote API management server to analyze API request statistics.

8. The method of claim 1, wherein the metadata includes a latency of the servicing the API request.

9. The method of claim 1, further comprising configuring the local API proxy, including:
    establishing a secure connection between the local API proxy and the remote API management server;
    generating a public key;
    generating a private key; and
    sending the generated private key.

10. The method of claim 9, wherein the key comprises the private key.

11. The method of claim 10, further comprising validating the API request, wherein the validating includes authenticating the signed token using the public key.

12. The method of claim 11, wherein if the token is not authenticated, the API request is not allowed to proceed.

13. The method of claim 9, wherein the token is relayed by the local API proxy.

14. The method of claim 1, wherein the API request includes a credential, the credential is provided to the remote API management server and the remote API management server provides an indication that the API request is allowed to proceed.

15. The method of claim 1, further comprising:
    validating the API request;
    if the API request is validated, allowing the API request to proceed; and
    if the API request is not validated, not allowing the API request to proceed.

16. The method of claim 1, further comprising receiving, from the remote API management server, privileges, wherein the privileges identify whether the API request is allowed.

17. A system comprising:
    one or more computers and one or more storage devices storing instructions that are operable, when executed by the one or more computers, to cause the one or more computers to perform operations comprising:
    providing, by a local API proxy deployed at a local deployment environment, a key to a remote API management server that is not deployed at the local deployment environment;
    receiving, at the local API proxy, a first request from an application for a token that authorizes the application to utilize the local API proxy to service API requests;

in response to receiving the first request, providing, by the local API proxy and to the remote API management server, a second request for the token where the second request identifies the local API proxy and the application;

receiving, from the remote API management server and in response to the second request, the token, where the token includes access permissions for the application signed by the key provided to the remote API management server by the local API proxy;

providing the token to the application as a response to the first request;

receiving, from the application and at the local API proxy deployed at the local deployment environment, an API request that includes the token;

determining whether the token in the API request is valid based on whether the token is signed by the remote API management server with the key provided by the local API proxy to the remote API management server;

in response to determining that the token is valid, utilizing the local API proxy to service the API request at the local deployment environment;

establishing a connection with the remote API management server after the API request is serviced by the local API proxy; and providing to the remote API management server, via the connection, at least metadata about the API request.

18. A non-transitory computer-readable medium storing software comprising instructions executable by one or more computers which, upon such execution, cause the one or more computers to perform operations comprising:

providing, by a local API proxy deployed at a local deployment environment, a key to a remote API management server that is not deployed at the local deployment environment;

receiving, at the local API proxy, a first request from an application for a token that authorizes the application to utilize the local API proxy to service API requests;

in response to receiving the first request, providing, by the local API proxy and to the remote API management server, a second request for the token where the second request identifies the local API proxy and the application;

receiving, from the remote API management server and in response to the second request, the token, where the token includes access permissions for the application signed by the key provided to the remote API management server by the local API proxy;

providing the token to the application as a response to the first request;

receiving, from the application and at the local API proxy deployed at the local deployment environment, an API request that includes the token;

determining whether the token in the API request is valid based on whether the token is signed by the remote API management server with the key provided by the local API proxy to the remote API management server;

in response to determining that the token is valid, utilizing the local API proxy to service the API request at the local deployment environment;

establishing a connection with the remote API management server after the API request is serviced by the local API proxy; and providing to the remote API management server, via the connection, at least metadata about the API request.

\* \* \* \* \*

UNITED STATES PATENT AND TRADEMARK OFFICE
CERTIFICATE OF CORRECTION

PATENT NO. : 10,425,465 B1
APPLICATION NO. : 15/224294
DATED : September 24, 2019
INVENTOR(S) : Jha et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this
Thirtieth Day of June, 2020

Andrei Iancu
*Director of the United States Patent and Trademark Office*